United States Patent [19]

Mizuki

[11] 3,958,868
[45] May 25, 1976

[54] SOUND SYSTEM PINCH ROLLER ACTUATING DEVICE

[75] Inventor: Yoshiaki Mizuki, Iruma, Japan

[73] Assignee: Nihon Beru-Haueru Kabushiki Kaisha, Higashimurayama, Japan

[22] Filed: Mar. 10, 1975

[21] Appl. No.: 556,530

[30] Foreign Application Priority Data
Apr. 4, 1974    Japan............................49-38510

[52] U.S. Cl................................. 352/27; 352/178; 352/29
[51] Int. Cl.²........................................ G03B 31/02
[58] Field of Search ................ 352/27, 29, 30, 174, 352/175, 176, 177, 178, 179

[56] References Cited
UNITED STATES PATENTS

| 3,492,067 | 1/1970 | Matsubara | 352/178 |
|---|---|---|---|
| 3,751,149 | 8/1973 | Mueller | 352/177 |
| 3,880,504 | 4/1975 | Marvin | 352/72 |

Primary Examiner—Monroe H. Hayes
Attorney, Agent, or Firm—John E. Peele, Jr.

[57] ABSTRACT

In a sound motion picture camera, a pinch roller actuating device for displacing the pinch roller into engagement with a constantly rotating capstan for transporting an elongated web such as sound film. The pinch roller contacting device includes a manually actuatable camera operating trigger member movable into and out of operative engagement with a control member provided with a neutral portion and an active portion which moves the pinch roller into engagement with the capstan. The neutral portion is provided to move the control member slightly, if at all, even if the trigger member is moved significantly after the pinch roller has contacted the capstan through displacement by the active portion.

5 Claims, 4 Drawing Figures

SOUND SYSTEM PINCH ROLLER ACTUATING DEVICE

The present invention relates to an improvement in a sound motion picture camera, and particularly a pinch roller actuating device for maintaining the pinch roller at a uniform pressure against the capstan to enhance transporting film at a constant rate through the sound station.

In motion picture cameras for simultaneous recording of image and sound on a film, the film is transported both through an aperture or image station portion by a shuttle and through a recording portion or sound station by a capstan and pressure or pinch roller. The rate of film transport through the stations is maintained as consistent as possible for obtaining synchronization of picture and sound. The film is transported through the sound station by a constantly rotating power capstain against which the film is held in engagement by the pinch roller. The film is fed thereby through the sound station at a uniform rate. However, if the pinch roller fails to press the film against the capstan at a constant pressure, the rate of film transport can vary. Generally, the pinch roller is removed from contact with the capstan when the camera is inoperative; and is actuated into engagement when film is positioned therebetween and the camera is operative for recording sound.

In an existing sound motion picture camera, as the start button or comera operating trigger is depressed against the force of a spring member, the pinch roller is actuated into contact with the capstan. The spring member in this camera reacts directly and proportionally to the depressing force applied to the start button. Hence, a large force, measured at about 2 kg., is required for actuating the start button. Further, the start button is not always maintained depressed at a uniform pressure, after camera operation has begun and the pinch roller has been moved into contact with the capstan. The resulting irregular pressure to the start button causes a change in the contact force of the pinch roller against the capstan. Therefore, the film transporting speed through the recording station changes causing loss of synchronization between picture and sound. Particularly, such film transport irregularities can cause variations in recorded sound which can be detected during reproduction. Although relatively small fluctuations in speed can be detected as to sound, relatively large fluctuations are required for ready detection of variations resulting from the visual images.

To overcome the problem of variations in transport of film through the sound station, a device is provided for a motion picture camera to cause the pressure by which the pinch roller is applied to the capstan to be constant and uniform as long as sound is being recorded on the film. This constant and uniform pressure is not affected directly if a change occurs in the pressure which is applied to the operating button. Such changes in the pressure applied to the operating button occur in that an operator has difficulty in maintaining a constant pressure on the operating button. Also, often temporarily greater pressure is necessarily applied to close a switch after initial actuation of the camera. Thus, the pressure by which the pinch roller is forced against the capstan must be suitable for constant transport of the film. Further, the pressure must be applied without requiring large and excessive force after pinch roller to capstan engagement.

An object of the present invention is to provide in a sound camera a pinch roller actuating mechanism for maintaining uniform pinch roller to capstan contact.

Another object of the invention is to provide in a sound camera a pinch roller actuating mechanism requiring a first pressure on the camera control trigger for displacing the pinch roller into contact with the capstan and a second lighter pressure for mantaining the contact.

The above and other objects will become more apparent from the detailed description when considered with the accompanying drawings in which like numerals refer to like parts.

Figure 1:
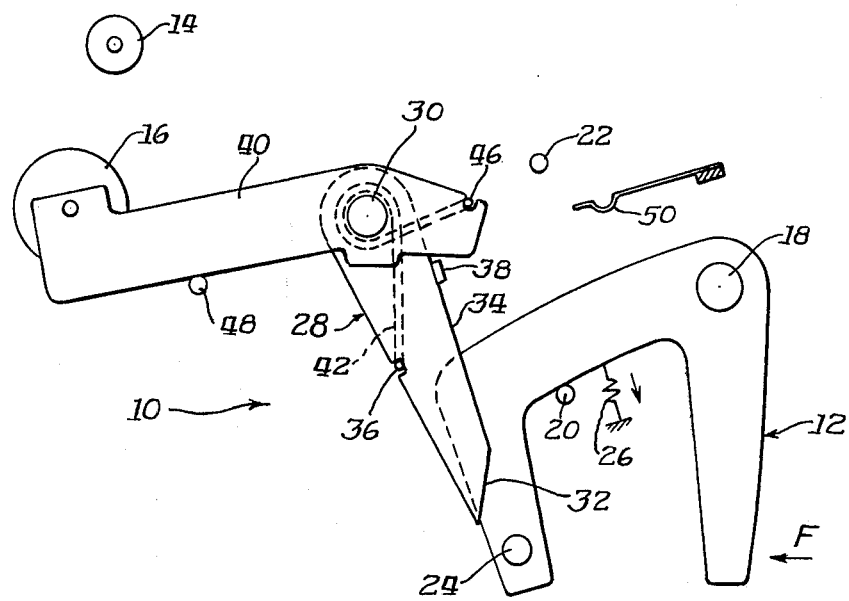
FIG. 1 is a schematic representation of a preferred embodiment of the present invention as applied to a web handling apparatus such as a motion picture camera.

Referring to the drawings, a pinch roller actuating device generally referred to at 10, is shown and explained as used in a motion picture camera adapted to simultaneously record pictures and sound. The camera operating mechanisms are actuated and/or energized upon depression of a control trigger 12. Particularly, for transporting film through the sound station of the camera, a capstan 14 is driven rotatably as a pinch roller 16 is moved relative thereto to hold a film (not shown) in engagement therewith. The trigger member is mounted for movement, such as rotation through a limited angular extent about a pivot shaft 18 supported on the housing of the camera (not shown). The trigger member is pivotable through an arc defined by the stop pins 20, 22. Internally of the camera housing, the trigger member carries a trigger pin 24 proximate an end thereof. A spring 26, biases the trigger member continuously toward the stop pin 20 in which the camera mechanisms are in an "off" condition. For camera operation, manual pressure of force "F" is applied to the trigger to cause rotation against the spring 26 thereby rotating the trigger member in a clockwise direction toward stop pin 22 as shown in FIG. 1.

Arranged for actuation by the trigger pin 24 of trigger member 12 is a control arm 28 which is mounted for pivotal movement about an axis through axle 30. The free end of the control arm, movable into and out of the path of the trigger pin 24, includes contiguous controlling surfaces defined as an active portion 32, and a neutral portion 34. Also, a recess 36 and a stop lug 38 are arranged on the control arm. The active portion 32 of the control arm 28 is provided with a sufficient angle to cause the arm to pivot when engaged and displaced by the trigger pin. The movement of the control arm causes displacement of the pinch roller toward the capstan when the arm engaged trigger pin 24 moves through an arcuate path engaged with the active portion. The neutral portion 34 of the control arm is a continuation of the trigger pin engaging surface, along which the pin rides after moving the extent of the active portion, and causing initial engagement of the pinch roller with the capstan. The neutral portion is formed at an angle which when engaged by the trigger pin after the pinch roller is in engagement with the capstan, seldom, if ever, moves the control arm further even if the trigger moves. That is, there is little further movement of the control arm following capstan-pinch roller contact. The stop lug 38 maintains a relative position between an arm 40 supporting the pinch roller 16 and the control arm which are together influenced by the force of a torsion spring 42. The torsion spring is wrapped about the axle 30 with one end engaging the recess 36 in the control arm to urge that arm toward a pinch roller disengaging position. The other end of the torsion spring engages in a recess 46 of the pinch roller supporting arm 40 to bias the pinch roller into engagement with the capstan when the control arm is in an operative orientation. The recess 46 in the supporting arm is arranged on an end of that arm from the pivot axle 30 about which the arm is supported and from the end on which the pinch roller 16 is supported. Together, the spring and the leverage applied to the control arm cooperate to cause the pinch roller to engage the capstan at a constant pressure. When the spring 42 biases the control arm to an inoperative position upon release of the trigger, the stop lug 38 engages the supporting arm and pivots same into engagement with a stop pin 48, fixed in a not shown mechanism support plate of the camera.

A switch contact 50 of a camera energizing circuit is arranged in the path of movement of the camera control trigger member 12. When the trigger is actuated so that a portion of the trigger member approaches stop pin 23, the contact 50 is engaged and the camera energizing circuit is completed to cause operation of the film transporting devices including, for example, the shuttle (not shown) and the capstan 14.

Operation of the pinch roller actuating mechanism described above is initiated when a force F is applied to the end of the trigger member 12 thereby causing pivoting of the trigger pin 24 carried thereon. As the trigger pin moves in an arcuate path, the pin engages the active portion 32 of the control arm 28, displacing the arm through an angle responsive to the camming effect of the trigger pin. The control arm is thereby moved in the clockwise direction from the path of the pin until the pin has moved off of the active portion thereof. and onto the neutral portion 34 thereof.

As the trigger pin 24 passes onto the neutral portion 34 of the control arm 28, the pinch roller 16 is moved into engagement with the capstan 14 to transport film at the requisite speed. Before the pinch roller has engaged the capstan, a capstan drive motor (not shown) is energized to rotatably drive the capstan. The drive motor may be energized by completing of the control circuit through engagement of the contact switch 50 when the trigger member is displaced against the stop pin 22. As the trigger pin moves along the neutral portion of the control arm response to changes in the position of the trigger member, the control arm is moved little, if at all. Hence, the pressure of the pinch roller against the capstan is substantially uniform. The force required to maintain the trigger arm in actuated orientation is minimized and made constant since the force of the torsion spring 42, is not directed against the trigger arm. That is, the torsion spring 42 supplied a force against the control arm 23 which engages the trigger pin 24 with the neutral portion 34. Thus, because the neutral portion is effectively a straight cam, the force of the spring is not transmitted to the trigger member. Hence, the primary force necessary to be overcome to maintain the trigger arm actuated is the biasing force of the trigger return spring 26. Experimentally, about 2 kilograms of force were required to initially actuate the trigger arm to cause the trigger pin to pass over the active portion of the control arm. Thereafter, only 300 grams of force were necessary to maintain the trigger pin against the neutral portion of the control cam in the actuated position.

Figure 2:
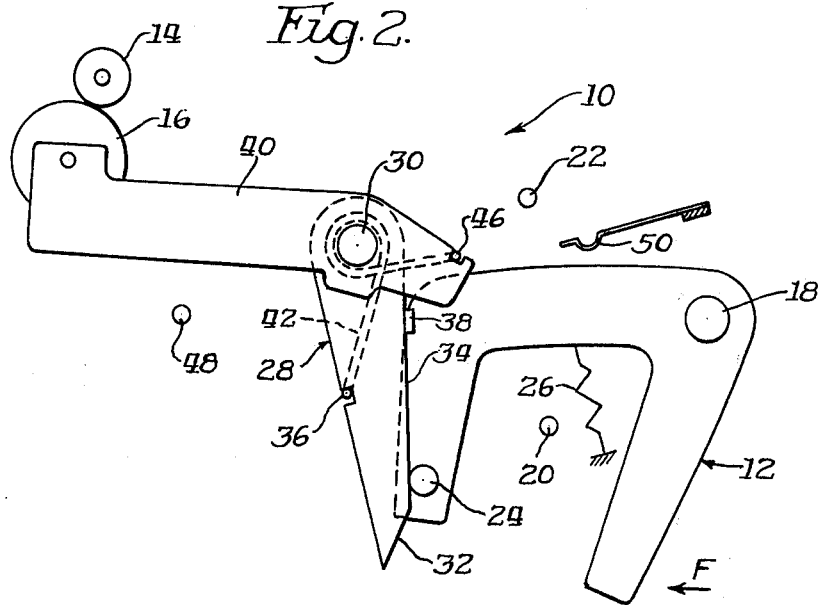
FIG. 2 is a similar schematic representation of the mechanism of FIG. 1 with some components displaced to an alternate position.
Figure 3:
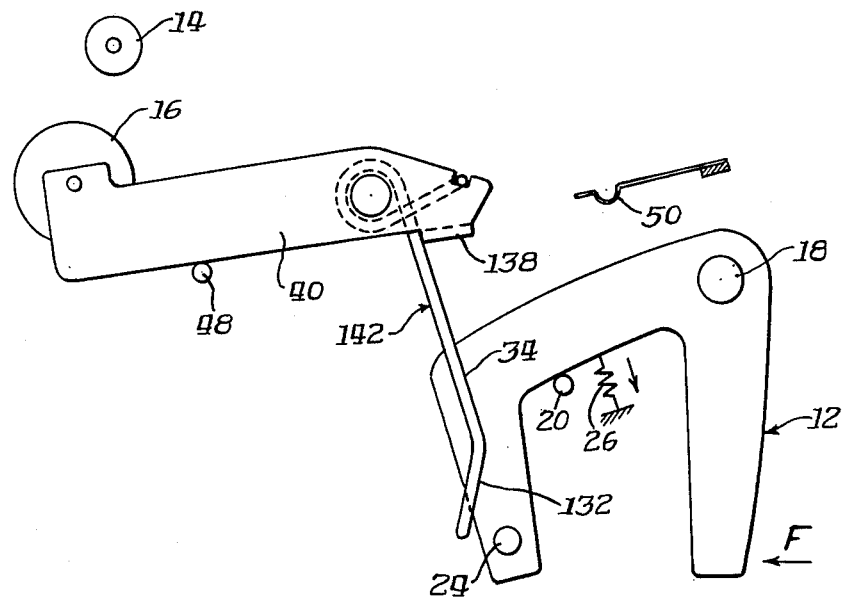
FIGS. 3 and 4 are schematic representations of embodiments with selected components substituted for components of similar function in FIG. 1.

Another embodiment of the pinch roller actuating mechanism is shown in FIG. 3. The control arm, and particularly the active portion and the neutral portion of that arm are provided on the torsion spring 142. That is, the control arm and the torsion spring are combined so that the torsion spring 142 with shaped portions 132, 134 is substituted for the control arm. The stop lug of the control arm is replaced by a stop lug 138 portion formed on the pinch roller supporting arm. Functionally, the mechanism is similar to the mechanism of FIGS. 1 and 2.

Figure 4:
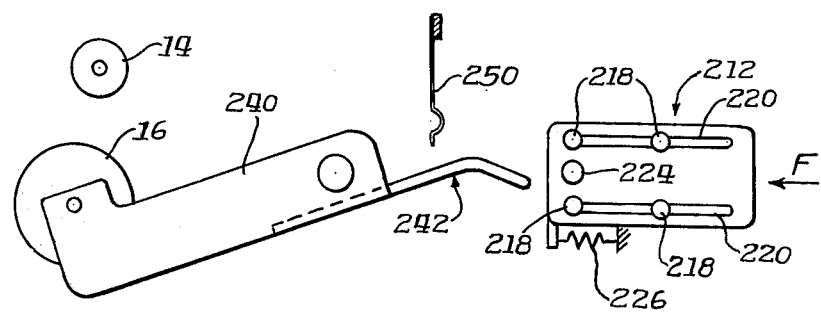

Yet another embodiment of the pinch roller actuating mechanism is shown in FIG. 4. In this embodiment, the trigger pin 224 is arranged on a longitudinally displaceable trigger member 212, which is movable in a path defined by cooperating guides 218, 220. A spring 226 biases the trigger member toward an inoperative position and is the primary force which must be overcome to maintain the trigger member in operative condition. Further, the pinch roller 16 is carried on a support member 240 to which the control arm 242 is effectively formed as an integral portion. That is, the control arm is configured as a shaped plate formed as part of the support member. The shape of the plate permits the trigger pin to displace the support member to cause the pinch roller to first engage the capstan, and thereafter to maintain the pinch roller in contact with the capstan. Responsive to the position of the trigger pin 224, the switch contact 250 is engaged whereby the camera circuits are energized.

In each of the embodiments of the pinch roller actuating mechanism, film is caused to be transported uniformly as the pinch roller engages the capstan with a pressure which changes little, if at all regardless of movement of the trigger arm within a predictable range. Isolation of trigger pressure changes from the pinch roller is obtained by causing the pinch roller to be actuated by a separate force than that required for positioning of the trigger member. Further, following engagement of the pinch roller with the capstan, large force is not required to keep the pinch roller in engagement. Thus, a distinguishable force is necessary to bring the pinch roller into initial engagement with the capstan, as compared to the force required to maintain engagement of the pinch roller. The difference provide a positive indication by the camera user that camera operation has been initiated.

A pinch roller actuating device according to this invention may be used in other web handling apparatus in which elongated web material, such as magnetic tape, is transported.

What is claimed is:

1. In a motion picture camera having a control trigger and a sound station at which sound is recorded on film simultaneously with images, the sound station including a capstan and a pinch roller for transporting film through the sound station, and improvement in a pinch roller actuating mechanism comprising:

a pinch roller control member pivotable about a fixed axis;

means carried by the control trigger for engaging said control member, and for moving same about said axis;

said pinch roller control member including a first controlling surface and a second controlling surface, the first controlling surface when engaged by said control trigger being an active portion for actuating said pinch roller into operative condition and the second controlling surface being a neutral portion for maintaining said pinch roller in operative condition;

a pinch roller support member actuatably by said control member for causing engagement of said pinch roller with the capstan responsive to actuation of said control trigger, and at a constant pressure isolated from the pressure applied to said control trigger; and said pinch control member including a spring means for urging said pinch roller support member from a pinch roller and capstan engaged orientation when said control member is engaged and displaced by said control trigger toward a pinch roller and capstan disengaged orientation, the force of said spring means being isolated from said control trigger.

2. An improvement as in claim 1 wherein said pinch roller support member is pivotably mounted coaxially with said pinch roller control member, and is coupled with said control member to move therewith from one orientation to another orientation.

3. In a motion picture camera having a control trigger and a sound station at which sound is recorded on film simultaneously with images, the sound station including a capstan and a pinch roller for transporting film through the sound station, improvements in a pinch roller actuation mechanism comprising;

a pinch roller control member pivotable about an axis between a first orientation and a second orientation;

means carried by the control trigger for engaging said control member and displacing same from said first orientation to said second orientation during a portion of the movement of the control trigger;

a pinch roller support member pivotable co-axially with said pinch roller control member, and being actuatable from a first orientation to a second orientation by said control member for causing engagement of said pinch roller with the capstan responsive to displacement of said control trigger, a spring means for urging said pinch roller control member from a pinch roller and capstan engaged orientation when said control member is engaged and displaced by said control trigger toward a pinch roller and capstan disengaged orientation, and;

including means carried by said control trigger to isolate the force of said spring means from said control trigger.

4. In a motion picture camera having a control trigger and a sound station at which sound is recorded on film simultaneously with images, the sound station including a capstan and a pinch roller for transporting film through the sound station, improvements in a pinch roller actuating mechanism comprising:

a pinch roller control member mounted pivotably about an axis for movement between a first orientation and a second orientation;

controlling surfaces arranged on said control member;

means carried by the control trigger of engaging said controlling surface of said control member and displacing said control member from said first orientation during engagement of one of said controlling surfaces and maintaining said control member in said second orientation during engagement of another of said controlling surfaces;

means biasing said control member from said second orientation toward said first orientation;

a pinch roller support member pivotable coaxially with said pinch roller control member to cause engagement of the pinch roller with the capstan responsive to displacement of said control member as moved from said first orientation to said second orientation by said control trigger;

whereby said pinch roller is biased against said capstan at a constant pressure when said control member is in said second orientation.

5. An improvement as in claim 4 including means carried by said control trigger to isolate the force of said spring means from said control trigger when said neutral portion of said control member is engaged by said means on said control trigger.

* * * * *